Figure 1:
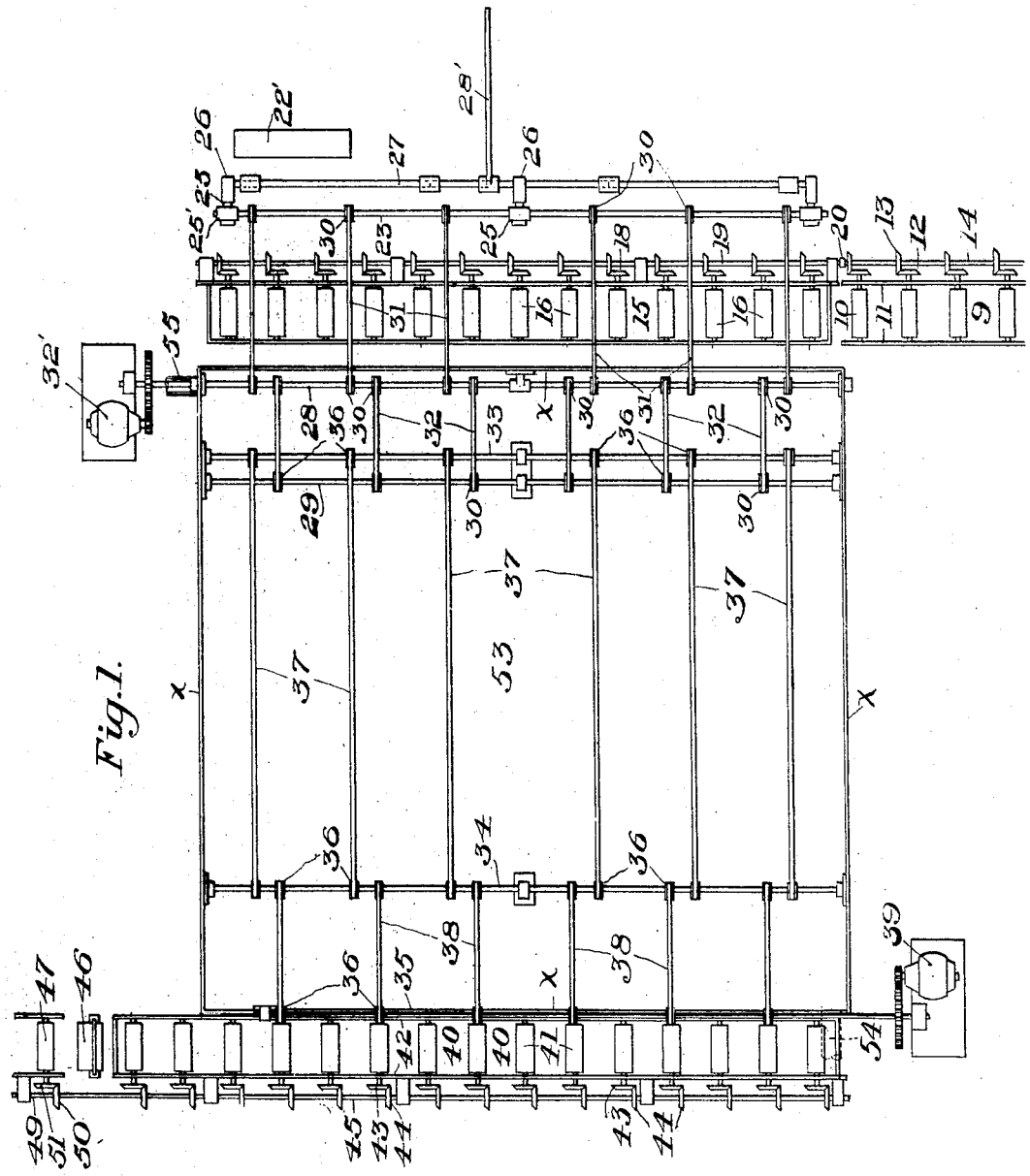

J. M. HORE.
CONVEYING APPARATUS.
APPLICATION FILED DEC. 3, 1907.

923,356.

Patented June 1, 1909.
3 SHEETS—SHEET 1.

WITNESSES
Eddie M. Hamilton
E. Albert Power

INVENTOR
John M. Hore
By John J. Power
Attorney

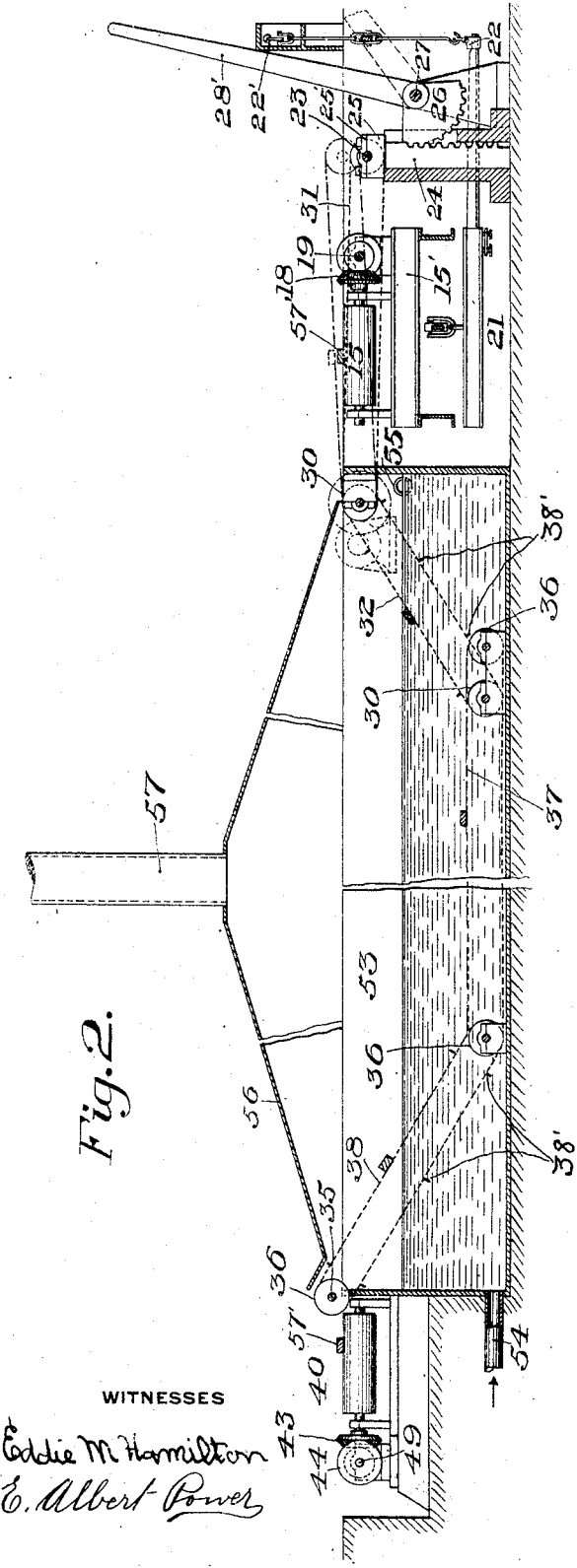

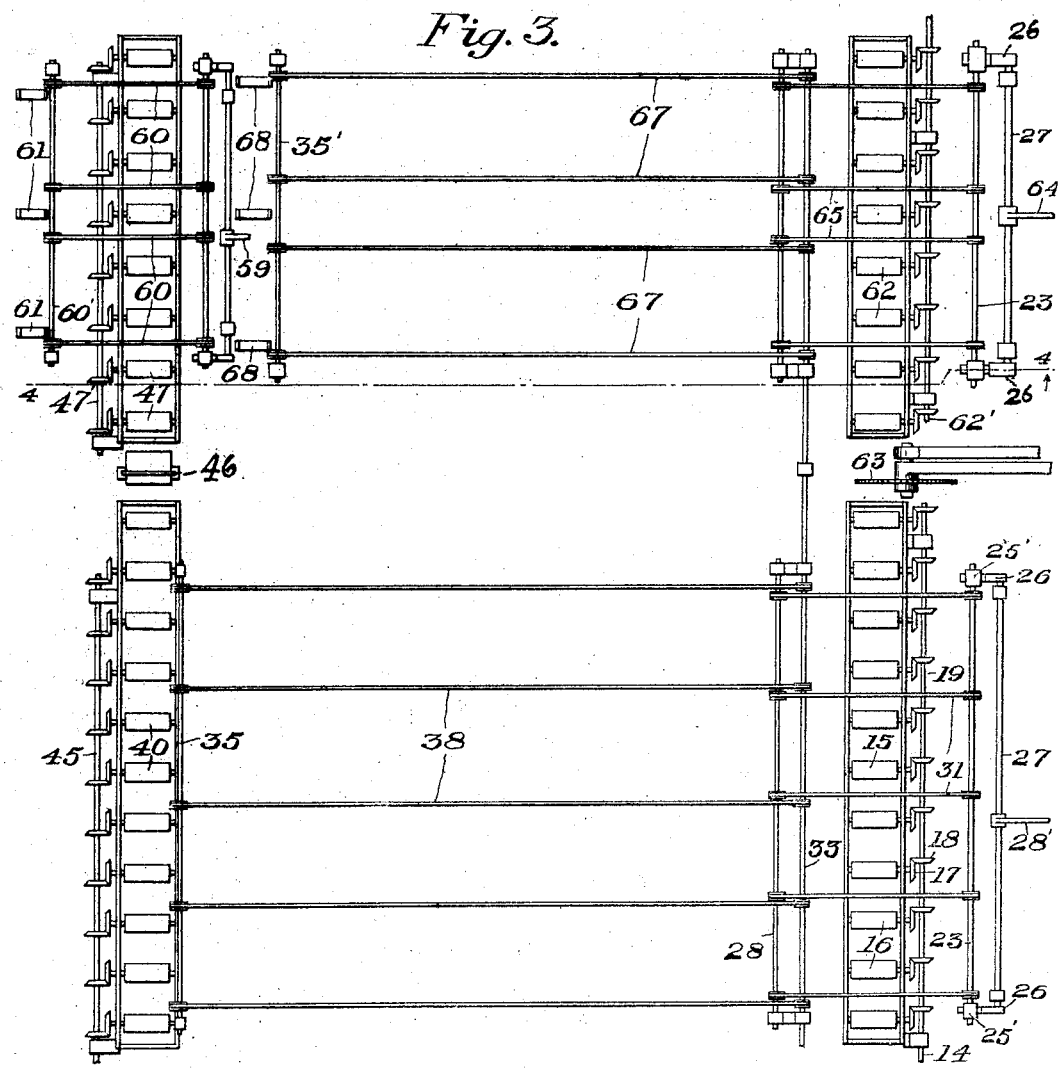
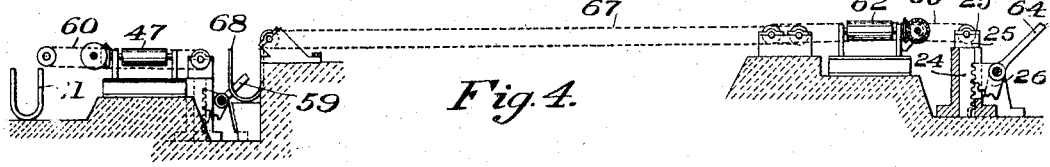

UNITED STATES PATENT OFFICE.

JOHN M. HORE, OF PITTSBURG, PENNSYLVANIA.

CONVEYING APPARATUS.

No. 923,356.　　　　Specification of Letters Patent.　　　　Patented June 1, 1909.

Application filed December 3, 1907. Serial No. 404,924.

*To all whom it may concern:*

Be it known that I, JOHN M. HORE, a citizen of the United States, resident of Pittsburg, in the county of Allegheny and State of Pennsylvania, have invented a new and useful Improvement in Conveying Apparatus; and I do hereby declare the following to be a full, clear, and exact description thereof.

My invention pertains to apparatus to be used in connection with the conveying of iron or steel from the rolls in rolling mills after the rolling process, and is intended to perform mechanically, efficiently, and economically as to time and cost, operations that are at present performed by hand and at comparatively great cost.

The object of my invention is to mechanically carry rolled muck iron from the rolls to a point where while still retained by the apparatus the weighing of the material will be effected, after which the material may be carried by the apparatus to a bosh where it will be cooled by being inserted into the water of the bosh, after which it is advanced to a shears to be cut, as would be the practice if the product is what is known as muck iron, but if the product is what is known as finished or shapes, the weighing and the inserting into the bosh may both be omitted and the material passed from the feed rollers to a hot saw or to a cold shears to be cut into lengths and subsequently discharged into suitable receptacles adapted to hold the lengths in bundle form.

Like reference numerals in the specification refer to like parts in the drawings in which—

Figure 1 is a plan view of the apparatus and a bosh. Fig. 2 is a sectional elevation with a cover over the bosh. Fig. 3 is a plan view of the apparatus when used without the bosh. Fig. 4 is an elevation in section on lines 4—4 of Fig. 3.

Referring to the drawings, a feed roller conveyer section 9 is arranged adjacent to a stand of rolls (not shown) and having rollers 10 supported at each end thereof in the bearings 11 and carrying small bevel gears 12 in engagement with the gears 13 on the shaft 14 and leading to a feed roller conveyer section 15 having rollers 16 carrying the bevel gears 18 on the shaft 19 which is connected to the shaft 14 by a universal coupling at 20. The feed roller 15 is mount- ed on a scale platform 15' (Fig. 2) below which is the lever 21 which is connected at 22 to a suitable weighing scale in the scale box 22' for the purpose of weighing the material while it is on the feed roller conveyer section 15. The shaft 23 carries the racks 24 (Fig. 2) which are secured to said shafts by the bearing 25 being bolted to the caps 25', the racks 24 being engaged and operated by the segmental gears 26 on the shaft 27 when the latter is operated by the lever 28'. On each of the shafts 23, 28, and 29, are sprocket wheels 30 which operate the chain carrier comprising chains 31 and 32 by the motion of the shaft 28 which is driven by motor 32', the chains 31 operating in different planes, and in their lower position being below the level of the rollers 16 on the feed roller conveyer section 15 as shown in Fig. 2. On the shafts 33, 34, and 35, are succeeding sprockets 36 and chains 37 and 38 operated by the shaft 35 which may be driven by the motor 39 or any suitable motive power, all of the chains being provided with dogs 38' The feed carrier 40 is arranged transversely to the chain carriers and comprises the rollers 41 carried on the frame 42 and having beveled gears 43 meshing with the gears 44 on the shaft 45, the shears 46 being arranged relative to said feed roller 40 and the succeeding feed roller 47 which are operated on the shaft 49 by reason of the gears 50 thereon meshing with the gears 51.

A pool of water or bosh 53, preferably below ground-level, is arranged within the area indicated by the lines $x$ (Fig. 1), the course of the chains 32, and of the chain carriers 37 and 38 forming a broken line and being through the water in the bosh as shown in Fig. 2, the water being supplied to the bosh through a supply pipe 54, the pipe 55 serving as an exhaust or outlet for the water of the bosh which is inclosed by a suitable cover 56 having a funnel 57 which affords an outlet for the steam from said bosh.

Motion being imparted to the shaft 14 by a motor or any suitable means, to put the feed roller conveyer sections 9 and 15 in motion, and the shafts 28 and 35 being driven by the motors 32' and 39 (Fig. 1) to operate the chain carriers, and the feed rollers 40 and 47 operating by any suitable power applied to the shaft 49, the operation of the apparatus is as follows: A bar or sheet of muck iron, for instance, emerging from the rolls would pass on to the feed roller conveyer section 9 by the action of which it progresses onto the feed roller conveyer section 15 where the adjustment of said feed roller conveyer section 15 and the lever 21 allows the weight of the iron to register on the beam or scale. The lever 28' may then be depressed to operate the shaft 27 and cause the segments 26 to act upon the racks 24 and elevate the shaft 23 and thereby raise the chains 31 to their higher position and thus lift the bar of iron 57' from the roller table (Fig. 2) and allow the travel of the chains 31 to carry the iron onto the chains 32 by which it is carried into the water of the bosh and to the chains 37 on which it passes to the succeeding chains 38 by which the iron is carried from the bosh and discharged onto the feed roller 40 (Fig. 2) by which it is moved under the shears 46 and onto the feed roller 47 during its progress onto which the shears may be operated to cut the iron into desired lengths. If the material that is being turned out from the rolls is other than muck iron or what is known as finished, or shapes, then in that case the weighing of the material may be dispensed with, and the material will not be carried through the bosh, but having been fed onto the feed roller conveyer section 15 will be raised therefrom on the chains 31 (Fig. 3) by the operation of the lever 28' and conveyed directly over the circular end of the chain carrier 38 where, by its own gravity, it will be deposited upon the feed rollers 40 on which it will travel under the cold shears 46 onto the feed roller 47 preferably having, in this instance, an independent shaft 47', when the shears 46 may be operated to cut the material into the desired lengths and the lever 59 being then operated, the chain carrier 60 will raise the material from the feed roller 47 and being actuated by the movement of the shaft 60' will carry it the length of the carrier where it will fall by its own gravity into the U-shaped receptacles 61 which are adapted to hold the materials in bundle form, (Fig. 3). If it is desired to cut the material at a hot saw instead of on the cold shears, the lever 28' will not be operated to raise the material from the feed roller conveyer section 15 but the material will be allowed to travel onto a succeeding feed roller 62 operated by the shaft 62' (Fig. 3) when the saw 63 may be utilized to cut the material into the desired lengths, and the lever 64 operated to elevate the chain carrier 65 to raise the material from the feed roller 62 and convey it to a communicating carrier 67 which will carry it to a point where by its own gravity it will fall into the U-shaped receptacles 68 adapted to contain it in bundle form and from which it may be removed in any desirable manner. In this arrangement the feed roller conveyer sections are operated by independent shafts 14, 62', 45 and 47', the chain carriers being actuated by the motion of the shafts 33, 28, 35, and 60' which may be driven by any suitable motive power.

It will be obvious that the levers for raising the carriers may be eliminated and the raising of said carriers having the material thereon may be effected by power applied thereto, or that said levers if retained may be operated by hand or by mechanical means.

It will be apparent that the apparatus herein shown and described may be constructed differently in many details, and the arrangement of the parts varied without departing from the principle of the invention, or sacrificing any of the advantages thereof.

What I claim as my invention and desire to secure by Letters Patent is:

1. In a feed roller conveyer, the combination of a feed roller, a scale platform, a succeeding feed roller table mounted on the scale platform, shafts operatively connected to the rollers on the feed roller and feed roller table, a yielding member connecting said shafts to adapt the latter to be operated jointly and to allow an independent movement of the shaft on the feed roller table for the purpose of a weighing operation by the feed roller table, and a transversely arranged mechanism for carrying material from the feed roller table after the weighing operation.

2. In a feed roller conveyer, the combination of a feed roller adapted to receive material from rolls, a scale platform, a succeeding feed roller table mounted on the scale platform for the purpose of a weighing operation, shafts operatively connected to the rollers of the feed roller and feed roller table, and a yielding member for connecting said shafts to operate jointly and to permit the shaft of the feed roller table to gravitate when the latter is gravitated upon the scale platform by material in transit, to effect a weighing operation.

3. In a feed roller conveyer, the combination of a feed roller adapted to receive material from rolls, a scale platform, a succeeding feed roller table mounted on the scale platform for the purpose of weighing material in transit on said table, universally connected shafts adapted to operate the feed roller and the rollers on said feed roller table and to permit the gravitation of said table by material in transit thereon.

4. In a feed roller conveyer, the combination of a feed roller adapted to receive material from rolls, a scale platform, a succeeding feed roller table mounted on the scale platform for the purpose of a weighing operation, universally connected shafts for operating the feed roller and the rollers on the feed roller table and adapted to permit the gravitation of said table by material in transit thereon to weigh the material, a chain carrier arranged between the rolls of the feed roller table and operating transversely thereof and means for raising and lowering the chain carrier to transfer material from the feed roller table after the weighing operation.

In testimony whereof, I the said JOHN M. HORE have hereunto set my hand.

JOHN M. HORE.

Witnesses:
J. L. TREFALLER, Jr.,
E. ALBERT POWER.